(12) United States Patent
Strege et al.

(10) Patent No.: US 7,100,289 B1
(45) Date of Patent: Sep. 5, 2006

(54) MICROELECTRONIC VEHICLE SERVICE SYSTEM SENSOR

(75) Inventors: Timothy A. Strege, Sunset Hills, MO (US); Michael T. Stieff, Wentzville, MO (US); Nicholas J. Colarelli, III, St. Louis, MO (US)

(73) Assignee: Hunter Engineering Company, Bridgeton, MO (US)

( * ) Notice: Subject to any disclaimer, the term of this patent is extended or adjusted under 35 U.S.C. 154(b) by 0 days.

(21) Appl. No.: 11/024,215

(22) Filed: Dec. 22, 2004

(51) Int. Cl.
*G01B 7/30* (2006.01)
(52) U.S. Cl. .................................. 33/203; 33/203.12
(58) Field of Classification Search .................. 33/203, 33/203.12–203.21
See application file for complete search history.

(56) References Cited

U.S. PATENT DOCUMENTS

| | | | |
|---|---|---|---|
| 4,138,825 A * | 2/1979 | Pelta ........................ | 33/203.18 |
| 4,319,838 A | 3/1982 | Grossman et al. | |
| 4,515,221 A * | 5/1985 | van der Lely ................ | 33/318 |
| 4,833,787 A * | 5/1989 | Van Steenwyk ............. | 33/302 |
| 4,879,670 A | 11/1989 | Colarelli, III | |
| RE33,144 E | 1/1990 | Hunter et al. | |
| 5,038,485 A | 8/1991 | Beissbarth | |
| 2003/0233759 A1 * | 12/2003 | Taylor ......................... | 33/304 |
| 2004/0194327 A1 * | 10/2004 | Bryan ...................... | 33/203.18 |

FOREIGN PATENT DOCUMENTS

DE 19825740 12/1999

OTHER PUBLICATIONS

Web site copy/Analog Devices: MEMS and Sensors: Home—Oct. 8, 2004 (2 pages).

Kionix—"Precision in Motion"-KGF01 Series, Aug. 11, 2004 (3 pages).
Kionix—"Precision in Motion"-KXF01 Series Data Sheet, Oct. 8, 2004 (3 pages).
VTI Technologies—"High Accuracy Differential Inclinometer"—SCA103% Series Apr. 22, 2004 (2 pages).
VTI Technologies-"Inclinometer"-SCA103T Series—Aug. 26, 2004 (2 pages).
Nonresonant Micromachined Gyroscopes With Structural Mode-Decoupling; C. Acar and A. M. Shkel;IEEE Sensors Journal, vol. 3, No. 4, Aug. 2003 (pp. 497-506).
Crossbow Technology, Inc.; "Tilt Sensors" (Solid State, Low Range, Analog Series) (2 pages), no date.
Best of SENSORS EHPO Spring 2002; Micro Strain; 3DM-GX1; (3 pages).
Sensors—Sep. 2004—Electrolytic Tilt Sensors and Imclinometers (6 pages).
SAE Technical Paper Series; "Measuring Vehicle Dynamics with a Gyro Based System" Reinhold Badmann-A-DAT Corp.; Mar. 2003; (9 pages).
Hunter Engineering Company; DSP5000 Series Sensors, For Hunter Computerized Wheel Alignment Systems; (12 pages), no date.

* cited by examiner

*Primary Examiner*—G. Bradley Bennett
(74) *Attorney, Agent, or Firm*—Polster, Lieder, Woodruff & Lucchesi, L.C.

(57) ABSTRACT

Compact and robust sensors for utilization with vehicle wheel alignment angle sensor units and vehicle service devices. The sensors incorporate one or more micro-electromechanical devices configured to measure movement and/or orientation of the sensor about one or more orthogonal axes, such as when a wheel alignment angle sensor unit is coupled to a vehicle wheel during a vehicle wheel alignment angle measurement procedure, or when a vehicle lift system is articulated to raise or lower a vehicle. The sensor are further configured to provide output signals representative of the measured movement and/or orientation to a vehicle wheel alignment system processor or vehicle service device controller.

29 Claims, 8 Drawing Sheets

MICROELECTRONIC VEHICLE SERVICE SYSTEM SENSOR

CROSS-REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates to sensors utilized in vehicle service procedures, and in particular, to the improvement of traditional vehicle alignment angle sensors and moving vehicle service components by the incorporation of micromechanical accelerometers and gyroscopes.

During vehicle service procedures, the measurement of angles and angular changes associated with vehicle components and vehicle service devices, such as vehicle lifts, is critical. On a vehicle, the measurement of the alignment angles of the vehicle wheels is critical to vehicle handling, performance, and fuel economy. On vehicle service devices, such as vehicle lift rack systems, the measurement of the angular alignment between left and right vehicle supporting runways, as well as the angular orientation of lifting components is critical to determine if the surface on which a vehicle is disposed is level and/or the height at which the vehicle has been elevated.

Various systems have been designed to facilitate the measurement and alteration of the principle vehicle wheel alignment angles on automotive vehicles such as light trucks and passenger cars. Principle wheel alignment angles include the toe angle, which generally corresponds to the direction in which a wheel is pointing, and the camber angle, which corresponds to the inward (negative) or outward (positive) tilt of the wheel relative to a vertical center plane of the vehicle. Procedures and methods by which additional vehicle wheel alignment angles such as caster and steering axis inclination (SAI) can be determined from measurements of the wheel toe angles and camber alignment angles are well known, and are described in SAE Publication 850219 to January, entitled "Steering Geometry and Caster Measurement".

In one type of vehicle wheel alignment system, sensors units configured for measuring vehicle wheel angles are removably mounted to the individual vehicle wheels. For example, U.S. Reissue Pat. No. 33,144 to Hunter et al. and U.S. Pat. No. 4,319,838 to Grossman et al. each describe a vehicle wheel alignment system for vehicles having two axles which use cooperative pairs of electro-optical transducers removably mounted to the vehicle wheels to determine the toe alignment angles of each wheel of a vehicle. A typical arrangement of alignment angle sensors for a two-axle vehicle includes either six or eight toe alignment angle transducers carried by support assemblies removably mounted to the vehicle wheels, two on each steered (front) vehicle wheel, and one or two on each fixed (rear) wheel. The '144 and '838 patents illustrate the geometry of this arrangement and the various wheel alignment angles which can be measured or computed.

Typically, in a six-sensor configuration, a first electro-optical toe angle sensor associated with a front wheel is disposed on an arm extended from a transducer housing coupled to the vehicle wheel. The toe sensor disposed on the arm functions in cooperative relationship across the front of the vehicle with a corresponding sensor on the opposite side of the vehicle. A second electro-optical toe angle sensor disposed in the transducer housing functions in cooperative relationship with a corresponding electro-optical toe angle sensor disposed in a transducer housing removably mounted on a rear wheel on the same side of the vehicle. Optionally, in an eight sensor configuration, a second electro-optical toe sensor associated with the vehicle's rear wheel is disposed on an arm extended from the transducer housing to function in cooperative relationship across the rear of the vehicle with a corresponding sensor on the opposite side of the vehicle.

To obtain a measurement of a vehicle wheel camber angle, U.S. Pat. No. 4,879,670 to Colarelli describes the use of a commonly utilized gravity-referenced accelerometer/inclinometer which is removably mounted to a vehicle wheel. The use of a gravity-referenced accelerometer/inclinometer to measure the camber angle of a vehicle wheel assumes that the vehicle is stationary and disposed on a surface which is level and flat. If the vehicle is disposed on a vehicle lift system during the procedure, the runways of the vehicle lift system may be inclined with respect to each other or to a horizontal plane, possibly resulting in miscalculation of the proper vehicle wheel alignment angles.

While the '670 Colarelli reference describes the use of a force balanced tilt sensor and associated electronics, alternative commonly utilized designs may utilize electrolytic fluid-based tilt sensors and associated electronics. Typically, one or more gravity-referenced accelerometers/inclinometers are incorporated into the transducer housings or support assemblies mounted to the vehicle wheels, together with the various electro-optical toe angle transducers, power sources, and associated communication and logic circuits.

Exemplary commonly utilized vehicle wheel alignment transducers incorporating gravity-referenced angle sensors and electro-optical toe angle sensors are the DSP500 Series Sensors manufactured by Hunter Engineering Company of Bridgeton, Mo. for use with one of several vehicle wheel alignment console units. Individual transducers removably mounted to the vehicle wheels may communicate with each other, and with a wheel alignment console unit, either via communication cables or wireless transceivers.

An alternative type of commonly utilized vehicle wheel alignment angle measurement system acquires information related to the position and orientation of individual vehicle wheels in three dimensional space utilizing a optical targets and cameras. For example, as is shown in U.S. Pat. No. 5,675,515 to January, predetermined optical targets may be removably coupled to each wheel of the vehicle, and images of the optical targets acquired by cameras coupled to a vehicle wheel alignment console unit. By processing the acquired images, the position and orientation of each optical target (i.e., pitch, yaw, and roll) can be determined in a three-dimensional space, from which individual vehicle wheel alignment angle values can be calculated in a common coordinate reference system.

Both types of commonly utilized vehicle wheel alignment angle sensor systems suffer from several drawbacks. Wheel-mounted transducer housings incorporating electro-optical toe angle sensors and camber angle inclinometers are bulky units which are susceptible to damage from shock or impact, and require awkward extension arms to enable line-of-sight communication across either the front or rear of the vehicle during toe angle measurement procedures. Camera-based vehicle wheel alignment systems often require larger or dedicated service bays due to the distances which must be maintained between the camera and the optical targets. These system often require a permanent installation or mounting of the cameras and are typically not portable from one service bay to another.

Accordingly, it would be advantageous to provide an improved vehicle wheel alignment angle sensor system to which can replace or supplement commonly utilized vehicle wheel alignment angle sensors, which does not require bulky and awkward extension arms for toe angle measurement, and which has a reduced sensitivity to shock, impact damage, and dirty operating environments, but which are easily portable from one service location to another.

It would be further advantageous to improve or enhance existing vehicle service devices, such as vehicle lift systems or alignment systems, through the use of low-cost, compact and durable inclinometers and accelerometers to provide position and orientation information associated with moving components of the vehicle service devices or vehicle frame and body components.

BRIEF SUMMARY OF THE INVENTION

Briefly stated, the present invention provides compact and robust sensors for utilization with vehicle wheel alignment angle sensor units and vehicle service devices. The sensors incorporate one or more micro-electromechanical devices configured to measure movement and/or orientation of the sensor about one or more orthogonal axes, such as when a wheel alignment angle sensor unit is coupled to a vehicle wheel during a vehicle wheel alignment angle measurement procedure, or when a vehicle lift system is articulated to raise or lower a vehicle. The sensor are further configured to provide output signals representative of the measured movement and/or orientation to a vehicle wheel alignment system processor or vehicle service device controller.

In an alternate embodiment, a sensor unit for utilization with a vehicle wheel alignment angle measurement system is configured with diametrically opposed accelerometers configured to provide a pair of differential output signals representative of inclination of the sensor unit relative to the direction of gravity. A logic circuit operatively is coupled to receive the differential output signals provides a single ended output signal which has a high immunity to external interference, power supply noise, and thermal variations, providing increased signal stability during wheel alignment angle measurement procedures. The logic circuit is further configured to provide output signals to a vehicle wheel alignment system processor which are representative of a vehicle wheel angle.

In a next alternate embodiment, a sensor unit for utilization with a vehicle wheel alignment angle measurement system is configured with a micro-electromechanical gyroscope capable of detecting angular rotation about at least one axis. A logic circuit operatively is coupled to establish a reference orientation for the micro- electromechanical gyroscope about the axis, and to measure angular rotation of the sensor unit about the axis during a vehicle wheel alignment angle measurement procedure to provide output signals to a vehicle wheel alignment system processor which are representative of a vehicle wheel angle.

In a next alternate embodiment, a sensor unit for utilization with a vehicle wheel alignment angle measurement system is configured with a set of micro-electromechanical accelerometers and gyroscopes, and is capable of tracking dynamic and static orientation about three orthogonal axes. A logic circuit operatively is coupled to receive output signals from the accelerometer and gyroscopes to identify a position and orientation for the sensor unit in a multi-dimensional coordinate system, relative to a reference position, during a vehicle wheel alignment angle measurement procedure.

In a next alternate embodiment, a set of sensor units for utilization with a vehicle lift system are provided. Each sensor unit is configured with an accelerometer unit having diametrically opposed single-axis accelerometers to provide a pair of differential output signals representative of inclination of the sensor unit relative to the direction of gravity. A logic circuit associated with each sensor unit is operatively coupled to receive the associated differential output signals and to provide a single ended output signal representative of the sensor unit inclination which has a high immunity to external interference, power supply noise, and thermal variations. Each logic circuit is further configured to provide the output signal or a process representation of the associated sensor unit inclination to a vehicle lift system processor, enabling determination of vehicle runway levelness and/or control and monitoring of vehicle lift movement.

The foregoing and other objects, features, and advantages of the invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings.

DESCRIPTION OF THE PREFERRED EMBODIMENT

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Figure 1:
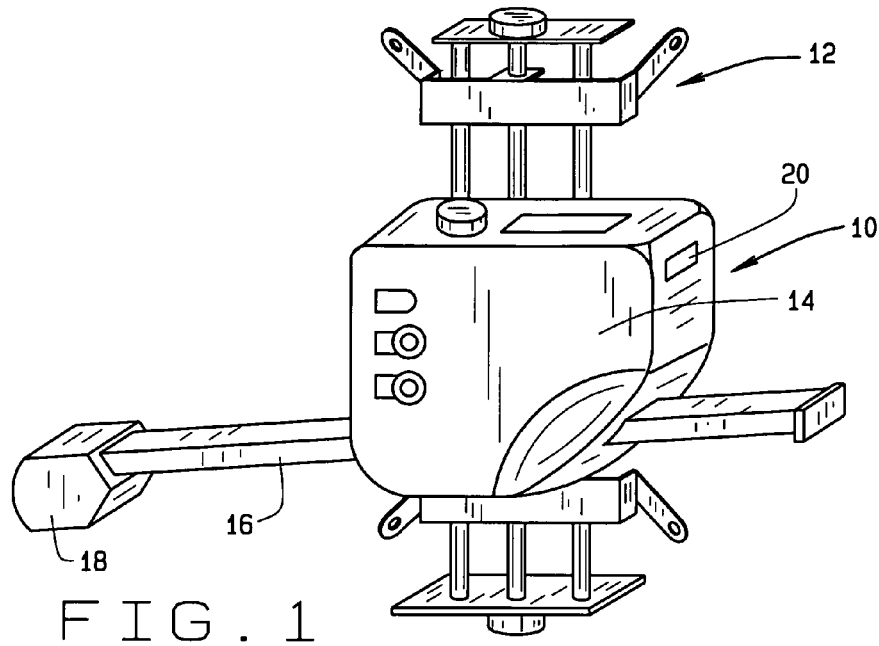
FIG. 1 is a perspective view of a prior art vehicle wheel alignment angle sensor assembly and wheel clamp.

Turning to FIG. 1, a commonly utilized wheel-mounted alignment angle sensor unit 10 is shown operatively coupled to a commonly utilized vehicle wheel clamp apparatus 12 for rotational movement about an axis. The alignment angle sensor unit 10 includes a sensor housing 14, and an optional cross-looking toe transducer support arm 16, which supports a cross-looking toe transducer housing 18 containing an electro-optical toe angle transducer (not shown) in spaced relationship to the sensor housing 14. The sensor housing 14 provides an enclosure within which is disposed the functional electronics of the alignment angle sensor unit, which may include a logic circuit, communications circuits for either corded or wireless communication with a vehicle wheel alignment system, a power supply, and one or more commonly utilized force balanced or electrolytic fluid-base inclinometers. Additionally included within the sensor housing 14 are one or more commonly utilized transverse electro-optical toe angle transducer assemblies 20.

Those of ordinary skill in the art will readily understand the operation of a commonly utilized wheel-mounted alignment angle sensor unit 10 incorporating commonly utilized force balanced or electrolytic fluid-based inclinometers to acquire wheel camber angle measurements, transverse toe angle transducers to acquire front-to-rear toe angle measurements on one side of a vehicle, and optional cross-looking toe angle transducer to acquire side-to-side toe angle measurements across either the front or rear of a vehicle, according to the particular configuration of sensors disposed about a vehicle.

Figure 2:
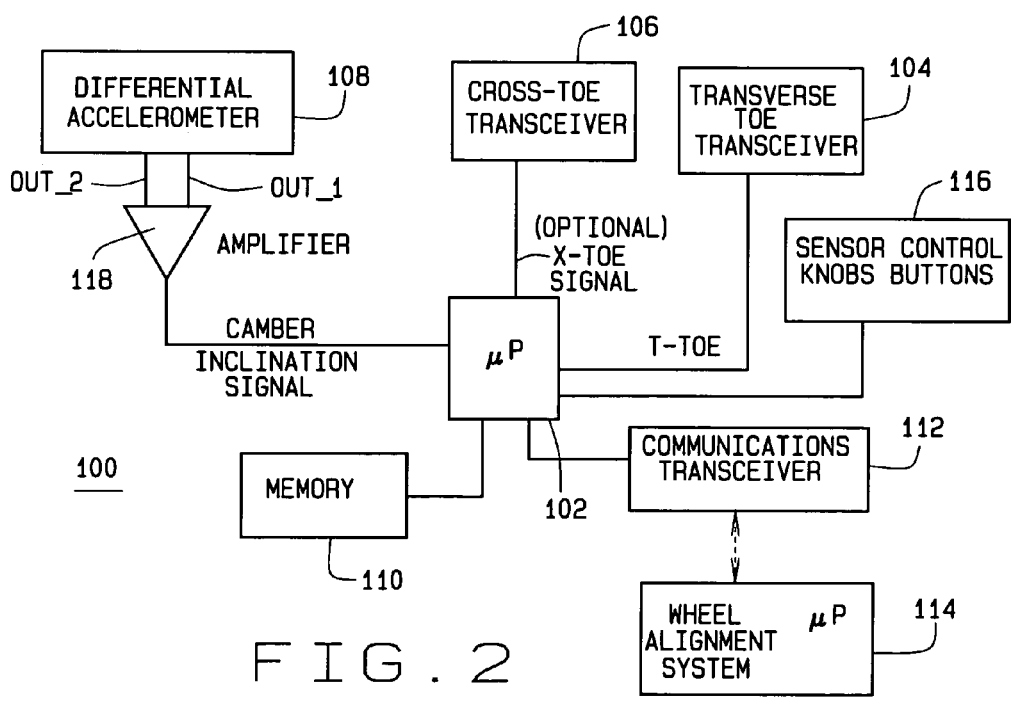
FIG. 2 is a block diagram illustrating the interaction between the components of a preferred embodiment of the vehicle wheel alignment angle sensor unit of the present invention.

Turning to FIG. 2, a functional component layout for a first embodiment of a vehicle wheel alignment sensor unit 100 of the present invention is shown. A microprocessor 102 or other suitable logic circuit such as a digital signal processor, micro-controller, or the like, having sufficient signal processing capacity is operatively coupled to communicate with a transverse toe angle transceiver circuit 104, an optional cross-toe angle transceiver circuit 106, and a differential output solid-state or micro-electromechanical (MEMS) accelerometer 108. The microprocessor 102 is preferably further coupled to an electronic memory 110, a communications transceiver 112 configured to communicate with a vehicle wheel alignment system controller 114, and sensor unit operator controls 116, as commonly incorporated in a vehicle wheel alignment sensor unit. The components of the vehicle wheel alignment sensor unit 100 are preferably disposed within a commonly utilized sensor housing 14, such as shown in FIG. 1.

The differential output accelerometer 108 incorporates a pair of micro-electromechanical single-axis accelerometer units disposed in opposed relationship along a common sensing axis. Suitable differential output accelerometers are sold under the designation series SCA103T, and are commercially available from VTI Technologies, Inc. of Dearborn, Mich. Each discrete single-axis accelerometer unit contained within the integrated circuit of the accelerometer 108 produces a diametrically opposed output signal, identified as Out_1 and Out_2, respectively, in response to a force acting on the accelerometer 108, such as the force of gravity.

Figure 3:
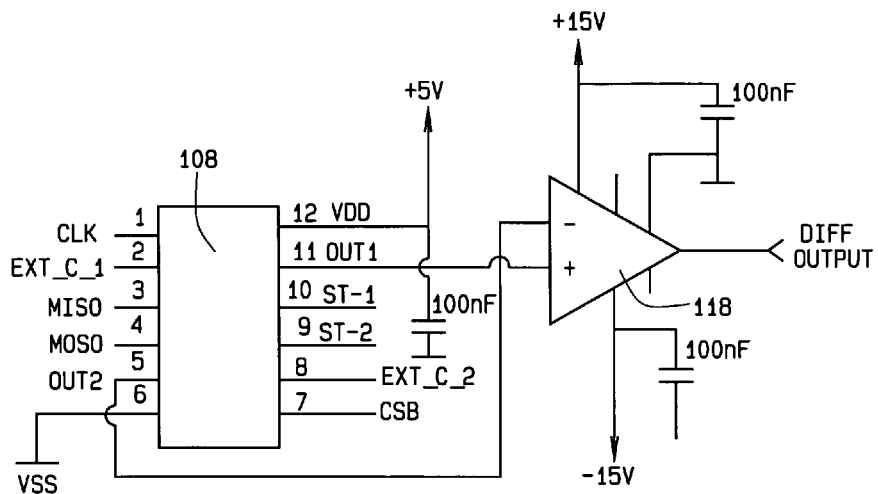
FIG. 3 is a prior art circuit diagram of a logic circuit generating a single output signal from a differential output accelerometer unit.
Figure 4:
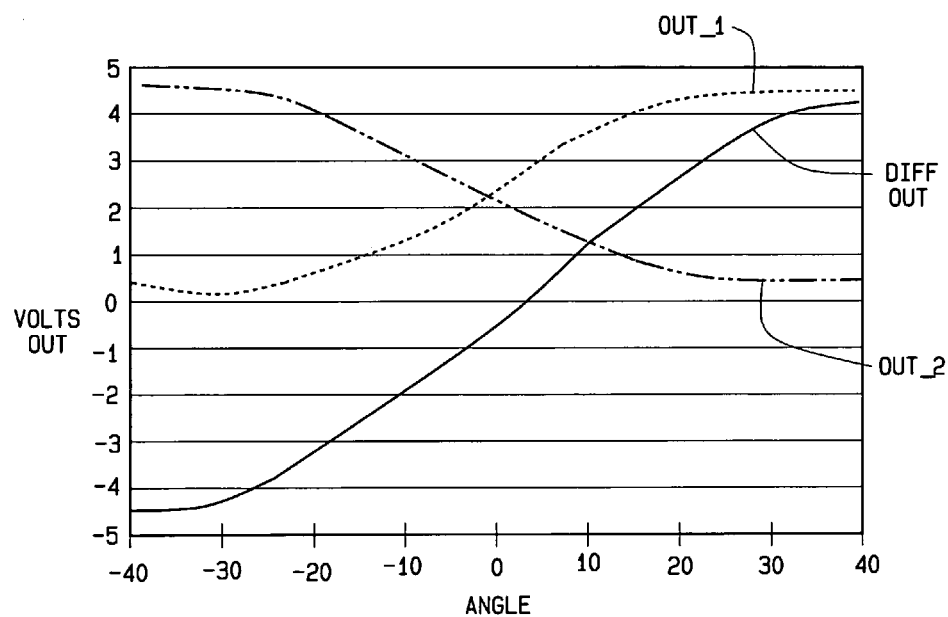
FIG. 4 is a graphical representation of the discrete and combined output signals from the differential output accelerometer unit of FIG. 3.

In a preferred embodiment, output signals Out_1 and Out_2 are communicated to a differential amplifier 118, operatively coupled to electrical power sources, as shown in FIG. 3, from which a single differential output signal Diff_Out is generated and passed to the microprocessor 102. Utilizing diametrically opposed output signals reduces the sensitivity of the system to temperature variations by providing an opposite temperature responses on each signal, resulting in a substantially reduced temperature sensitivity in the Diff_Out signal. FIG. 4 graphically illustrates an exemplary Diff_Out inclination signal from an differential amplifier 118 for a given set of Out_1 and Out_2 inputs from accelerometer 108. Alternatively, each output signal Out_1 and Out_2 are communicated directly to the microprocessor 102, which is configured to process the received signals to identify a measured inclination angle of the accelerometer 108.

When the accelerometer 108 is stationary, the only force acting on the accelerometer 108 is the vertical force of gravity, hence each output signal Out_1 and Out_2 is representative of an inclination angle between the sensing axis of the accelerometer 108 and the vertical force of gravity. In the preferred embodiment of the sensor unit 100, the accelerometer 108 is disposed in the sensor housing 14 to measure the camber angle of a vehicle wheel, i.e., such that a sensor axis of the accelerometer 108 is aligned vertically when the sensor housing 14 is mounted to a vehicle wheel having a camber angle of zero to within a required degree of tolerance.

Those of ordinary skill in the art will recognize that micro-electromechanical single-axis accelerometer units may require compensation for thermal effects, and accordingly, may incorporate internal or external thermal measurement and compensation circuits as is conventional.

Preferably, the microprocessor 102 of the vehicle wheel alignment sensor unit 100 is configured to condition and process the received inclination signals to obtain a measure of inclination in the same form as a measure of inclination received from a commonly utilized force-balanced or electrolytic fluid-based camber inclination sensor, rendering the replacement of the commonly utilized force-balance or electrolytic fluid-based camber inclination sensor in a vehicle wheel alignment sensor unit with a differential output accelerometer 108 transparent to the vehicle wheel alignment system controller 114.

Figure 5:
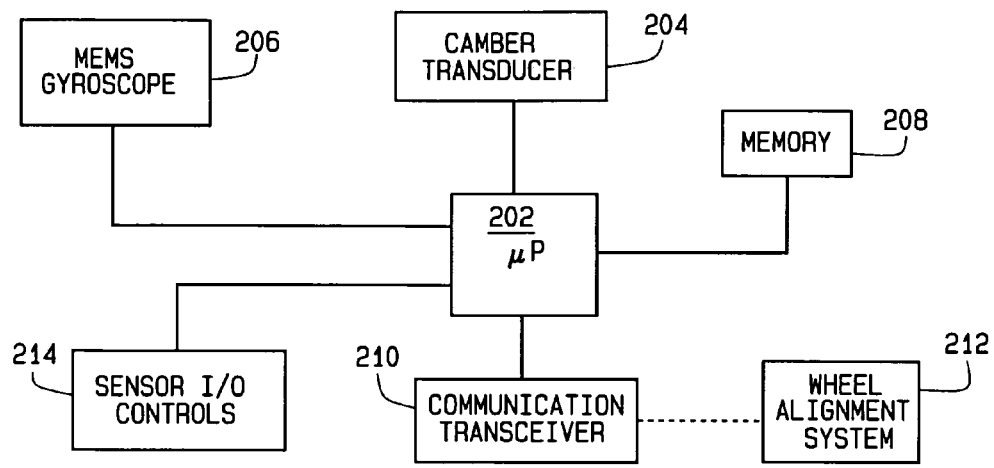
FIG. 5 is a block diagram illustrating the interaction between the components of an alternate embodiment of the vehicle wheel alignment angle sensor unit of the present invention incorporating a single-axis gyroscope for toe angle measurements.

Turning to FIG. 5, an alternate embodiment vehicle wheel alignment sensor unit 200 of the present invention is shown in component view. A microprocessor 202 or other suitable logic circuit such as a digital signal processor, micro-controller, or the like, having sufficient signal processing capacity is operatively coupled to communicate with a camber angle transducer 204, which may be either commonly utilized camber transducer, or a MEMS accelerometer/inclinometer, and with a micro-electromechanical gyroscopic device 206 configured to detect angular movement about at least an axis which is vertically aligned in the direction of gravity. Communications between the microprocessor and the camber angle transducer 204 may optionally be via a wireless communications link. Preferably, the gyroscopic device 206 functions on the principle of the Coriolis Effect, and is a capacitive-based sensing system. Rotation of the sensor about the sensing axis causes a shift in response of an oscillating silicon structure or proof mass, resulting in a change in the capacitance of the sensor. These changes in capacitance are detected and transformed into an analog output voltage signal which is proportional to the angular rage. An exemplary gyroscopic device 206 is the KXF01 Angular Rate Sensor manufactured by Kionix, Inc. of Ithaca, New York.

Preferably, the microprocessor 202 is further coupled to an electronic memory 208, a communications transceiver 210 configured to communicate with a vehicle wheel alignment system controller 212, and to one or more sensor unit operator controls 214, as commonly incorporated in a vehicle wheel alignment sensor unit. The components of the vehicle wheel alignment sensor unit 200 are preferably disposed within a commonly utilized sensor housing 14, such as shown in FIG. 1, configured without a cross-looking toe transducer support arm 16 supporting a cross-looking toe transducer housing 18 and associated electro-optical toe angle transducer, such as shown at 216 in FIG. 6.

In the embodiment shown in FIG. 5, the functionality of the cross-looking toe transceiver 106 and transverse toe angle transceivers 104 are replaced by the micro-electromechanical gyroscopic device 206. During measurement of vehicle wheel angles, the micro-electromechanical gyroscopic device 206 provides the microprocessor 202 with angular rate change information about the vertical axis, relative to a reference orientation, from which vehicle wheel toe alignment angles can be subsequently calculated by the vehicle wheel alignment system controller 212. Utilizing the wheel alignment angle sensor embodiment shown in FIG. 5, the toe alignment angles for a four-wheeled vehicle can be determined utilizing only four vehicle wheel alignment sensor units 200 in place of six or eight commonly utilized toe angle transceivers 104, 106. Those of ordinary skill in the art will recognize that in an alternate embodiment, a single vehicle wheel alignment sensor unit 200 could be utilized to acquire the vehicle wheel alignment angle measurements if it is moved from wheel to wheel after acquiring and communicating measurements associated with each wheel.

Figure 9:
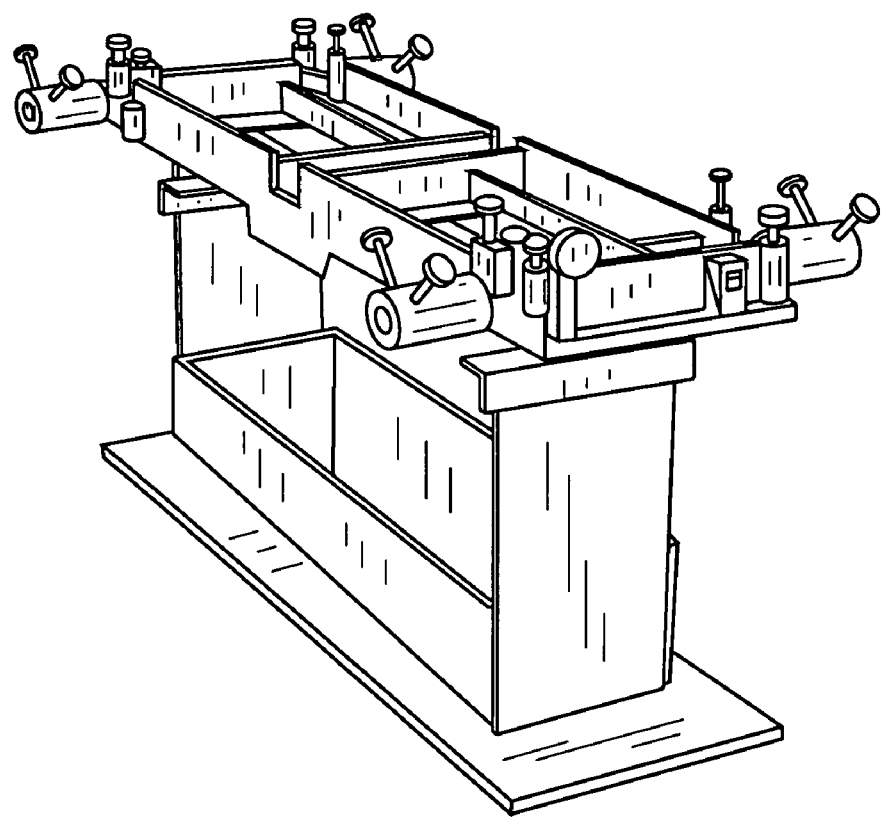
FIG. 9 is a perspective view of an exemplary fixture for use in calibrating a vehicle wheel alignment angle sensor unit of the present invention incorporating a single-axis gyroscope.

When utilizing gyroscopic devices 206, it is necessary to establish an initial reference orientation about a vertical axis relative to which vehicle wheel angular information can be referenced. In one embodiment, each vehicle wheel alignment sensor unit 200 is disposed in, and initialized at, a predetermined reference position prior to being operatively coupled to a vehicle wheel. For example, a known fixture such as shown in FIG. 9, which is stationary and stable, may be utilized to establish each vehicle wheel alignment sensor unit 200 in a predetermined reference position. Angular changes about the vertical axis from the reference position are measured by the gyroscopic device 206, and are received at the microprocessor 202. The changes are communicated to the vehicle wheel alignment system controller 212 as the vehicle wheel alignment sensor unit 200 is operatively coupled to a vehicle wheel, and as the vehicle wheel is moved during alignment angle adjustments.

The vehicle wheel alignment system controller 212 is configured with software to utilize the angular changes measured by each gyroscopic device 206 about the vertical axis between the predetermined reference position and the mounting position on each vehicle wheel, to calculate relative wheel toe alignment angles for each vehicle wheel of a vehicle.

For example, define ΔLF to be the measured angular change between the reference position and the Left Front vehicle wheel; ΔRF to be the measured angular change between the reference position and the Right Front vehicle wheel; ΔLR to be the measured angular change between the reference position and the Left Rear vehicle wheel; and ΔRR to be the measured angular change between the reference position and the Right Rear vehicle wheel. Then, those of ordinary skill in the art will recognize that various individual and total toe angles can be determined by comparison between measured angular changes between corresponding vehicle wheels. In a similar manner relative measurements of rotation about longitudinal and/or transverse axis could provide measurement of camber, caster, caster adjustment, and steering axis inclination.

Figure 7:
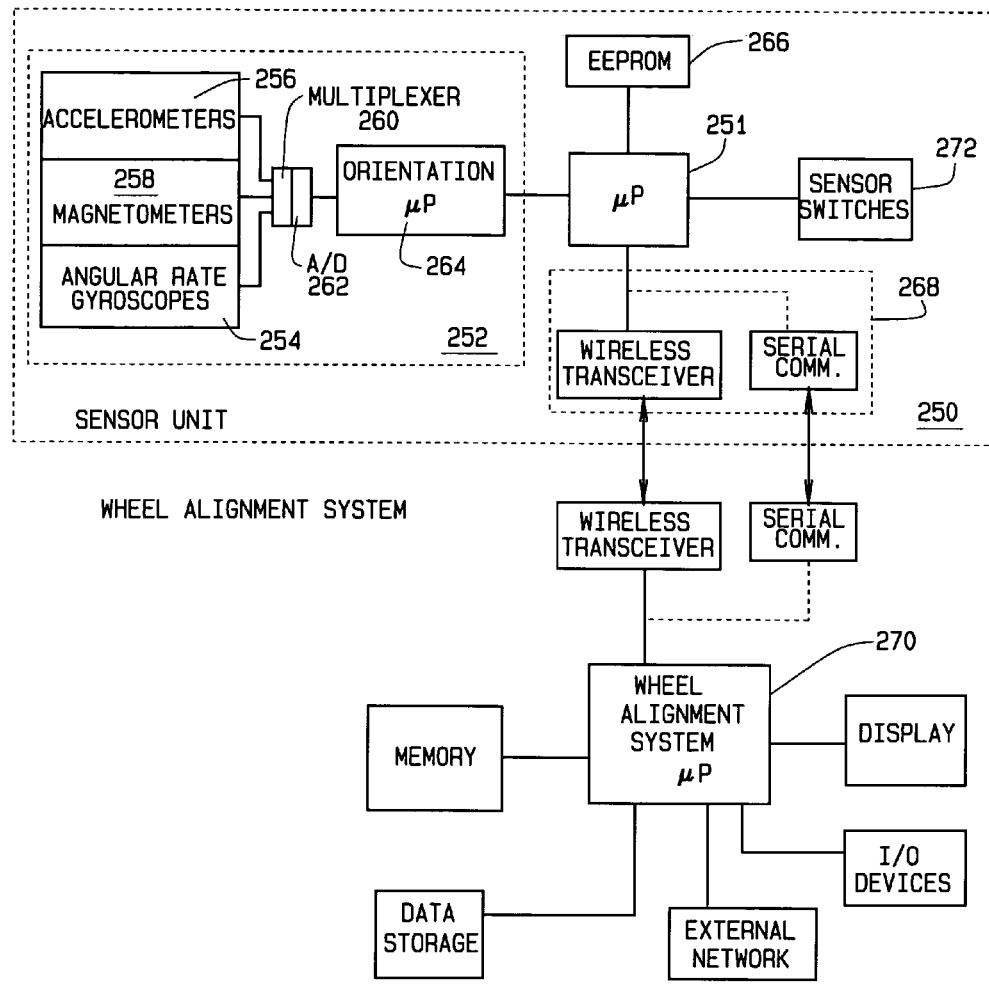
FIG. 7 is a block diagram of a vehicle wheel alignment sensor unit operatively coupled to a gyroscopically enhanced micro-electromechanical orientation sensor assembly.

In an alternate embodiment of the present invention, shown in FIG. 7, a vehicle wheel alignment sensor unit 250 includes a microprocessor 251 which is operatively coupled to a gyroscopically enhanced micro-electromechanical orientation sensor assembly 252 configured to provide orientation output about three orthogonal axis in both dynamic and static environments. A suitable orientation sensor assembly 252 is the 3DM-GX1 gyro-enhanced orientation sensor manufactured by MicroStrain of Williston, Vt. Within the orientation sensor assembly a set of micro-electromechanical gyroscopes 254 is configured to track dynamic orientation of the sensor, while a set of micro-electromechanical accelerometers 256 and magnetometers 258 are configured to track static orientation of the sensor assembly 252. Output from the various sensor components is combined into a single data stream by a multiplexer 260, converted from analog to digital format by an A/D converter 262, and passed to an orientation microprocessor 264. The orientation microprocessor 264 is configured with embedded software algorithms to process the received data an to generate an output signal to the microprocessor 251 representative of the orientation of the sensor assembly about each of three orthogonal axes (X, Y, and Z), in both static and dynamic conditions.

Figure 6:
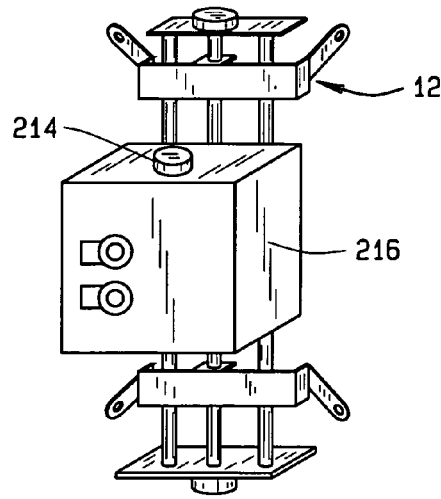
FIG. 6 is a perspective view of the alternate embodiment of a vehicle wheel alignment angle sensor of the present invention shown in FIG. 5.

Preferably, the microprocessor 251 is further coupled to an electronic memory 266, a communications transceiver 268 configured to communicate with a vehicle wheel alignment system controller 270, and to one or more sensor unit operator controls 272, as commonly incorporated in a vehicle wheel alignment sensor unit. The components of the vehicle wheel alignment sensor unit 250 are preferably disposed within a compact sensor housing 216, such as shown in FIG. 6.

In the embodiment shown in FIG. 7, the functionality of commonly utilized camber transducers, transverse toe transducers, and cross-looking toe transducers are replaced by the gyroscopically enhanced micro-electromechanical orientation sensor assembly 252.

During measurement of vehicle wheel angles, the gyroscopically enhanced micro-electromechanical orientation sensor assembly 252 provides the microprocessor 251 with both dynamic and static orientation information for three orthogonal axes, relative to a predetermined reference position for each sensor unit 250. Utilizing data from sensor units 250 mounted on each vehicle wheel, all vehicle wheel alignment angles can be subsequently calculated by the vehicle wheel alignment system controller 270. Determination of the vehicle wheel alignment angles from the pitch, yaw, roll information received from each vehicle wheel alignment sensor unit 250 is substantially similar to the determination of vehicle wheel alignment angles from optical target pitch, yaw, roll information acquired from camera-optical target based wheel alignment angle sensor systems.

Figure 8:
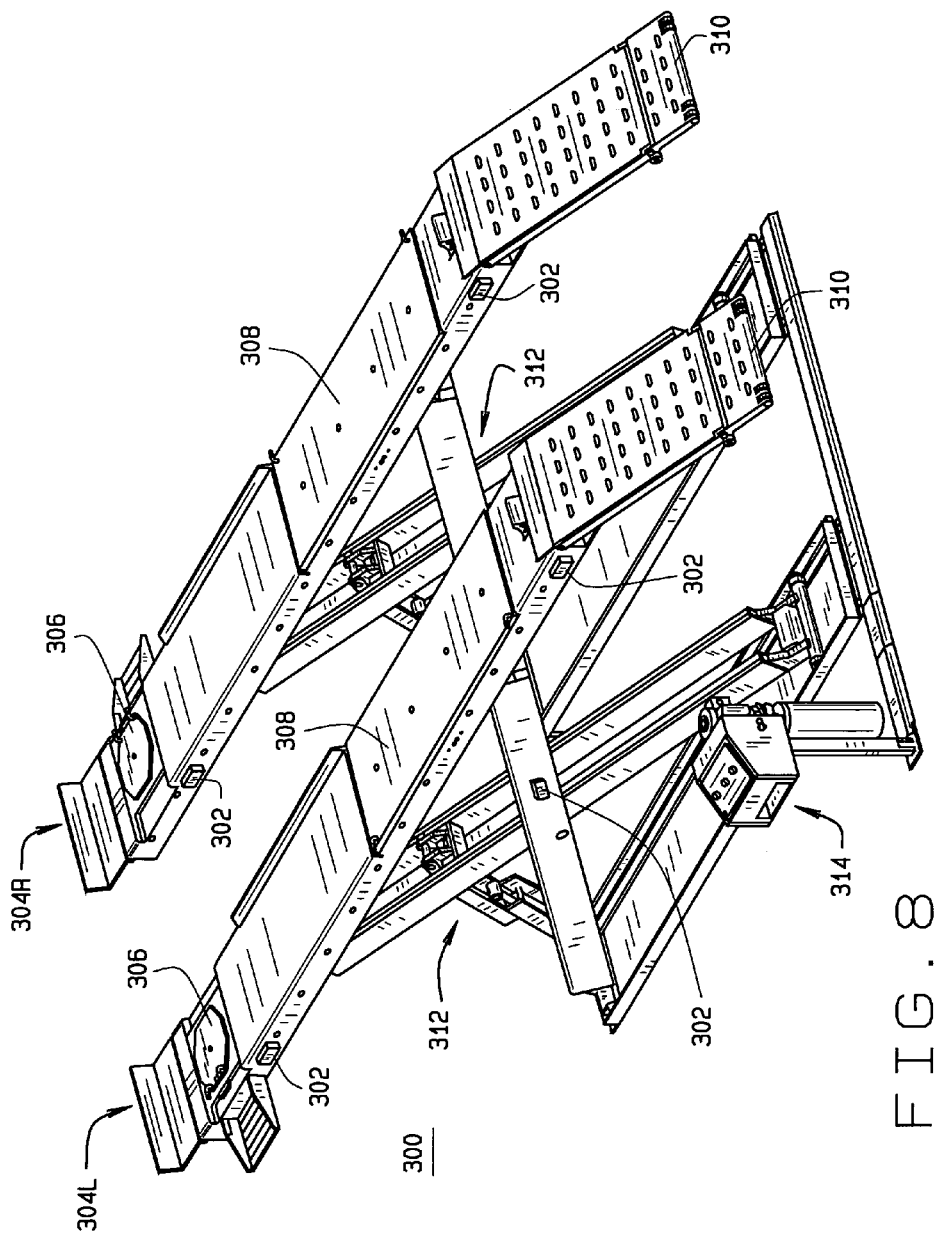
FIG. 8 is a perspective view of a vehicle lift system of the present invention incorporating micro-electromechanical inclinometers.

In an alternate embodiment of the present invention, a vehicle service device, such as a vehicle lift system 300 shown in FIG. 8 incorporates one or more differential output accelerometers 302, each of which incorporates a pair of micro-electromechanical single-axis accelerometer units disposed in opposed relationship along a common sensing axis, as previously described. Each discrete single-axis accelerometer unit contained within the integrated circuit of the accelerometer 302 produces a diametrically opposed output signal, identified as Out_1 and Out_2, respectively, in response to a force acting on the accelerometer 302, such as the force of gravity. The output signals Out_1 and Out_2 may be processed directly by a logic circuit or routed to a differential amplifier as previously described to obtain a single representative output corresponding to the inclination angle of the sensing axis of the accelerometer 302 relative to an acting force. When an accelerometer 302 is stationary, the only force acting on the accelerometer 302 is the vertical force of gravity, hence each output signal Out_1 and Out_2 is representative of an inclination angle between the sensing axis of the accelerometer 302 and the vertical force of gravity.

Those of ordinary skill in the art will readily recognize that the differential output accelerometers 302 may be replaced with various types of solid-state integrated circuit (i.e., MEMS) accelerometers and associated logic circuits, including convection- or thermal-based accelerometers, as well as dual-axis accelerometers or micromachined gyroscopes which provide comparable measurements sensitivity and robust functionality.

As shown in FIG. 8, the vehicle lift system 300 includes a pair of adjacent vehicle support runways 304L, 304R, each of which may optionally include a turnplate 306, a slip plate 308, and a vehicle access ramp 310. Each runway 304L, 304R is supported on an independent elevating mechanism 312, such as a pneumatic or hydraulically actuated scissor mechanism. By selectively disposing accelerometers 302 about the structure of the vehicle lift system 300, information associated with the elevation and levelness of the vehicle support runways 304L and 304R can be acquired.

A microprocessor or other suitable logic circuit associated with the vehicle lift system controls 314 may be configured to receive inclination signals from each of the accelerometers 302, and to utilize the received signals together with predetermined information associated with the geometry of the vehicle lift system to identify a variety of vehicle lift system operating conditions or in a leveling feedback control loop. For example, inclination signals from accelerometers 302 associated with the vehicle support runways 304L and 304R can be utilized to identify an a degree of tilt for each individual vehicle support runway, an overall tilt for a plane defined by the upper surfaces of the runways, or other runway conditions. Similarly, inclination signals from accelerometers 302 associated with the independent elevating mechanisms 312 can be utilized to determine synchronous movement of the elevating mechanisms, misalignment between the elevating mechanisms, and, when combined with known elevating mechanism geometry, vertical elevation height.

Those of ordinary skill in the art of vehicle service equipment design will readily recognize that the aforementioned measurements are exemplary, and that additional measurements associated with a vehicle service device, such as a vehicle lift system, can be acquired through the use of suitably disposed accelerometers 302. For example, additional measurements may be associated with movement of the turnplates 306 or slip plates 308, or the approach angles of the vehicle access ramps 310.

Figure 10:
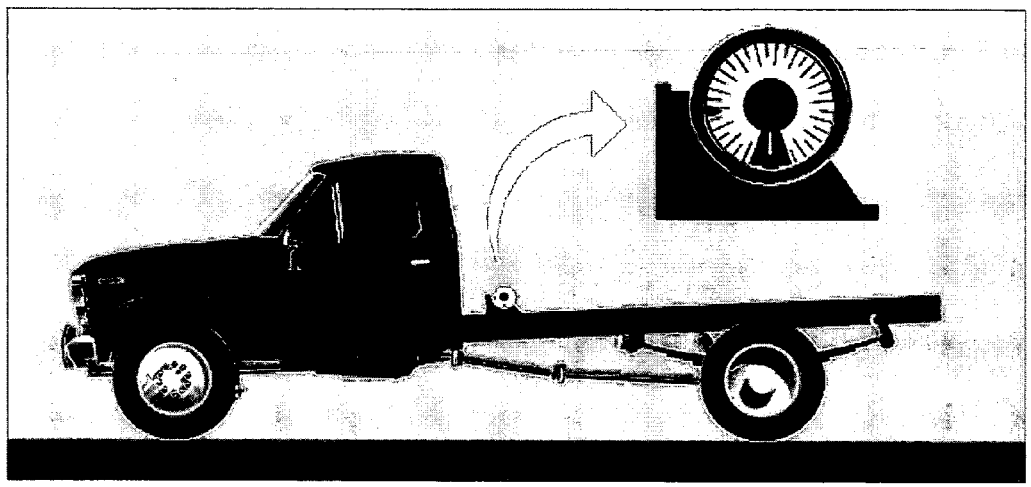
FIG. 10 is an illustration of a prior art analog frame angle measurement device in use.
Figure 11:
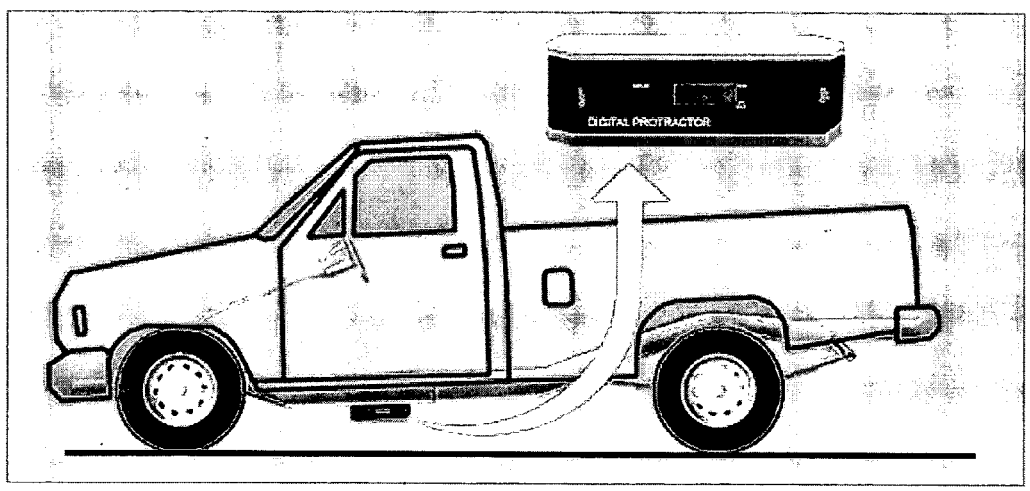
FIG. 11 is an illustration of a prior art digital frame angle measurement device in use.

For some vehicle service applications, measurements of an angle or orientation of the vehicle structure are required. For example, the suspension systems in some vehicles, such as light trucks, may be optimized for load carrying, and when the vehicle is empty, tend to position the load-carry portion or bed of the vehicle in an elevated position, such as shown in FIGS. 10 and 11. By providing a measurement of the orientation of the vehicle frame or vehicle structure, effects on the vehicle wheel alignment angle measurements caused by the unloaded vehicle suspension may be determined. Traditionally, such measurements are acquired by an operator using either an analog angle measurement device, such as shown in FIG. 10, or a digital inclinometer, as shown in FIG. 11.

However, analog and digital inclinometers are not incorporated into the vehicle service system, such as a wheel alignment system. An operator is required to manually read the measurement value displayed on the device, and to manually communicate the reading to the vehicle service system, possibly resulting in measurement errors or inaccuracy due to a mistake during in the reading of the inclinometer or during data entry.

Figure 12:
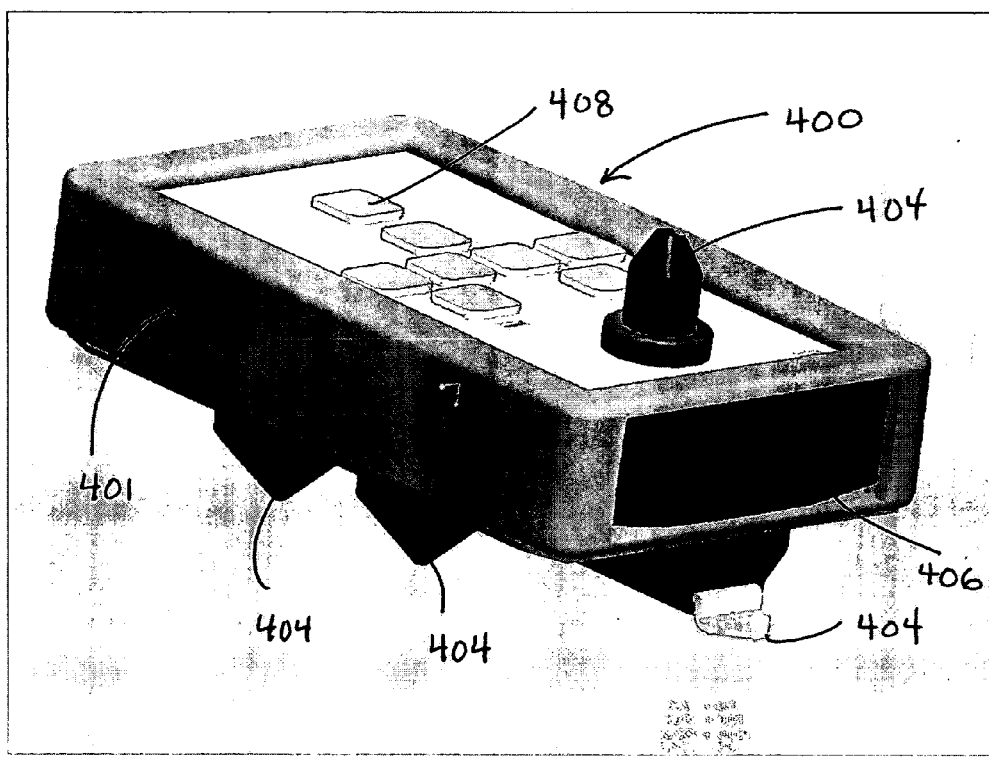
FIG. 12 is an illustration of a micro-electromechanical orientation sensor in a vehicle service system for use in measuring vehicle body orientation angles.

In an alternate embodiment of the present invention, a vehicle service system, such as a vehicle wheel alignment system, incorporates one or more portable inclinometer devices 400, such as shown at FIG. 12, capable of communicating orientation information wirelessly. Each inclinometer device 400 provides a housing 401 which incorporates a differential output accelerometer (not shown) consisting of a pair of micro-electromechanical single-axis accelerometer units disposed in opposed relationship along a common sensing axis, as previously described. Each discrete single-axis accelerometer unit contained within the integrated circuit of the accelerometer produces a diametrically opposed output signal, identified as Out_1 and Out_2, respectively, in response to a force acting on the accelerometer, such as the force of gravity.

Within the housing 401, the output signals Out_1 and Out_2 may be processed directly by a suitable logic circuit or routed to a differential amplifier, as previously described, to obtain a single representative output corresponding to the inclination angle of the sensing axis of the accelerometer relative to an acting force. When an accelerometer is stationary, such as when a reference point 404 the housing 401 is placed against a reference point or surface of a vehicle frame or body, the only force acting on the accelerometer is the vertical force of gravity, hence each output signal Out_1 and Out_2 is representative of an inclination angle between the sensing axis of the accelerometer and the vertical force of gravity.

The angle measurements acquired by the accelerometer are preferably communicated to the vehicle service system microprocessor or system controller wirelessly via a wireless transceiver 406 for use in subsequent vehicle service procedures or alignment angle measurements. Any wireless communications protocol suited for use in a vehicle service environment may be utilized. One or more input keys 408 may be provided on the housing 401 of the inclinometer 400, to facilitate the selection of operating functions of the inclinometer 400.

Those of ordinary skill in the art will readily recognize that the differential output accelerometers 402 may be replaced with various types of solid-state integrated circuit (i.e., MEMS) accelerometers and associated logic circuits, including convection- or thermal-based accelerometers, as well as dual-axis accelerometers or micromachined gyroscopes which provide comparable measurements sensitivity and robust functionality.

The present invention can be embodied in part in the form of computer-implemented processes and apparatuses for practicing those processes. The present invention can also be embodied in part in the form of computer program code containing instructions embodied in tangible media, such as floppy diskettes, CD-ROMs, hard drives, or an other computer readable storage medium, wherein, when the computer program code is loaded into, and executed by, an electronic device such as a computer, micro-processor or logic circuit, the device becomes an apparatus for practicing the invention.

The present invention can also be embodied in part in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented in a general-purpose microprocessor, the computer program code segments configure the microprocessor to create specific logic circuits.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

The invention claimed is:

1. A vehicle wheel alignment angle sensor unit comprising:
 a differential output accelerometer unit configured to output a pair of signals each of which is representative of an angle of inclination between a common sensing axis of said differential output accelerometer unit and a direction of gravity; and
 wherein said angle of inclination is representative of a vehicle wheel alignment angle.

2. The vehicle wheel alignment angle sensor unit of claim 1 further including a differential amplifier operatively coupled to said differential output accelerometer unit to receive each of said pair of output signals, said differential amplifier configured to output a differential output signal proportional to a difference between said pair of output signals, said differential output signal representative of an angle of inclination between said common sensing axis of said differential output accelerometer unit and a direction of gravity.

3. The vehicle wheel alignment angle sensor unit of claim 2 further including a microprocessor operatively coupled to receive said differential output signal, said microprocessor configured to process said differential output signal to identify said angle of inclination.

4. The vehicle wheel alignment angle sensor unit of claim 1 wherein said differential output accelerometer unit is a solid state integrated circuit.

5. The vehicle wheel alignment angle sensor unit of claim 1 wherein said differential output accelerometer unit is a micro-electromechanical device.

6. The vehicle wheel alignment angle sensor unit of claim 1 further including a microprocessor operatively coupled to receive said pair of output signals, said microprocessor configured to process said pair of output signals to identify said angle of inclination.

7. The vehicle wheel alignment angle sensor unit of claim 1 wherein said differential output accelerometer unit includes first and second single-axis accelerometers disposed diametrically opposite on said common sensing axis, said first accelerometer generating a first output signal of said pair of output signals, and said second accelerometer generating a second output signal of said pair of output signals.

8. The vehicle wheel alignment angle sensor unit of claim 7 wherein said first and second accelerometers have opposite reactions to forces acting along said common sensing axis.

9. The vehicle wheel alignment angle sensor unit of claim 1 wherein said vehicle wheel alignment angle is a camber angle.

10. A vehicle wheel alignment angle sensor unit comprising:
 a micro-electromechanical gyroscopic device configured to output a signal which is representative of an angular rate of change about at least one sensing axis of said gyroscopic device.

11. The vehicle wheel alignment angle sensor unit of claim 10 further including a microprocessor operatively coupled to said gyroscopic device to receive said output signal, said microprocessor configured to utilize said received signal to determine at least one wheel alignment angle.

12. An improved vehicle wheel alignment system having a system controller and at least one wheel alignment sensor unit operably configured to acquire data associated with an individual vehicle wheel, the improvement comprising:
 said wheel alignment sensor unit including a micro-electromechanical gyroscopic device configured to output a signal which is representative of an angular rate of change about a sensing axis of said gyroscopic device; and
 wherein the system controller is configured to said output signal from said wheel alignment sensor unit, and to determine at least one alignment angle for said vehicle wheel from said received output signal.

13. A vehicle wheel alignment angle sensor unit comprising:
 a micro-electromechanical orientation sensor configured to output a signal which is representative of an orientation of said orientation sensor about each of three orthogonal axes.

14. The vehicle wheel alignment angle sensor of claim 13 further including a microprocessor operatively coupled to said orientation sensor to receive said output signal, said microprocessor configured to utilize said received signal to determine at least one wheel alignment angle.

15. The vehicle wheel alignment angle sensor unit of claim 13 wherein said orientation sensor is configured to output a signal which is representative of a static orientation of said orientation sensor about each of three orthogonal axes.

16. The vehicle wheel alignment angle sensor unit of claim 13 wherein said orientation sensor is configured to output a signal which is representative of a dynamic orientation of said orientation sensor about each of three orthogonal axes.

17. An improved vehicle service system having a control unit, the improvement comprising:
 a portable inclinometer configured to measure an orientation of a surface, said portable inclinometer having at least one reference point configured for contact with said surface undergoing measurement;

a micro-electromechanical accelerometer unit operatively coupled to said portable inclinometer, said micro-electromechanical accelerometer unit configure to output to the control unit at least one signal representative of an angle of inclination between a sensing axis of said micro-electromechanical accelerometer unit and a direction of gravity; and wherein said angle of inclination is representative of an inclination of said portable inclinometer in contact with said surface.

18. The improved vehicle service system of claim 17 wherein said micro-electromechanical accelerometer unit is configure to output a pair of signals each of which is representative of an angle of inclination between said sensing axis and a direction of gravity; and further including a differential amplifier operatively coupled to said micro-electromechanical accelerometer unit to receive each of said pair of output signals, said differential amplifier configured to output to the control unit a differential output signal proportional to a difference between said pair of output signals, said differential output signal representative of an angle of inclination between a sensing axis of said micro-electromechanical accelerometer unit and a direction of gravity.

19. The improved vehicle service system of claim 18 wherein said micro-electromechanical accelerometer unit includes first and second single-axis accelerometers disposed diametrically opposite on said sensing axis, said first accelerometer generating a first of said pair of output signals, and said second accelerometer generating a second of said pair of output signals.

20. The improved vehicle service system of claim 19 wherein said first and second micro-electromechanical accelerometers have opposite reactions to forces acting along said sensing axis.

21. The improved vehicle service system of claim 17 wherein said portable inclinometer includes a housing and a wireless transceiver; and wherein said micro-electromechanical accelerometer unit is operatively coupled to said wireless transceiver to output to said control unit said at least one signal representative of an angle of inclination between a sensing axis of said micro-electromechanical accelerometer unit and a direction of gravity.

22. An improved vehicle lift system having a pair of vehicle support runways, at least one elevating mechanism configured to alter the vertical elevation of the pair of vehicle support runways and a control unit operatively coupled to the at least one elevating mechanism to control the vertical elevation of the pair of vehicle support runways, the improvement comprising:

at least one micro-electromechanical accelerometer unit operatively coupled to each vehicle support runway, each of said micro-electromechanical accelerometers configure to output to the control unit at least one signal representative of an angle of inclination between a sensing axis of said micro-electromechanical accelerometer unit and a direction of gravity; and wherein each of said angles of inclination are proportional to an inclination of the associated vehicle support runway.

23. The improved vehicle lift system of claim 22 wherein each of said micro-electromechanical accelerometer unit is configure to output a pair of signals, each of which is representative of an angle of inclination between said sensing axis and a direction of gravity; and further including a differential amplifier operatively coupled to each of said micro-electromechanical accelerometer units to receive each of said pair of output signals, each of said differential amplifiers configured to output to the control unit a differential output signal proportional to a difference between said pair of output signals, each said differential output signal representative of an angle of inclination between a sensing axis of said micro-electromechanical accelerometer unit and a direction of gravity.

24. The improved vehicle lift system of claim 23 wherein each of said micro-electromechanical accelerometer units includes first and second single-axis accelerometers disposed diametrically opposite on said sensing axis, said first accelerometer generating a first output signal of said pair of output signals, and said second accelerometer generating a second output signal of said pair of output signals.

25. The improved vehicle lift system of claim 24 wherein said first and second accelerometers have opposite reactions to forces acting along said sensing axis.

26. An improved vehicle lift system having a pair of vehicle support runways, at least one elevating mechanism having a moving component configured to alter the vertical elevation of the pair of vehicle support runways and a control unit operatively coupled to the at least one elevating mechanism to control the vertical elevation of the pair of vehicle support runways, the improvement comprising:

at least one micro-electromechanical accelerometer unit operatively coupled to the moving component of the at least one elevating mechanism, each of said micro-electromechanical accelerometers configure to output to the control unit at least one signal representative of an angle of inclination between a sensing axis of said micro-electromechanical accelerometer unit and a direction of gravity;

wherein each of said angles of inclination are proportional to a vertical elevation of said associated vehicle support runways; and wherein the control unit is operatively configured to utilize said at least one signal to control a vertical elevation of each of said vehicle support runways.

27. The improved vehicle lift system of claim 26 wherein each of said micro-electromechanical accelerometer unit is configure to output a pair of signals, each of which is representative of an angle of inclination between said sensing axis and a direction of gravity; and further including a differential amplifier operatively coupled to each of said micro-electromechanical accelerometer units to receive each of said pair of output signals, each of said differential amplifiers configured to output to the control unit a differential output signal proportional to a difference between said pair of output signals, each said differential output signal representative of an angle of inclination between a sensing axis of said micro-electromechanical accelerometer unit and a direction of gravity.

28. The improved vehicle lift system of claim 27 wherein each of said micro-electromechanical accelerometer unit units includes first and second single-axis accelerometers disposed diametrically opposite on said sensing axis, said first accelerometer generating a first of said pair of output signals, and said second accelerometer generating a second of said pair of output signals.

29. The improved vehicle lift system of claim 28 wherein said first and second accelerometers have opposite reactions to forces acting along said sensing axis.

* * * * *